(12) United States Patent
Kan et al.

(10) Patent No.: US 10,503,635 B2
(45) Date of Patent: Dec. 10, 2019

(54) SYSTEM AND METHOD FOR ADAPTIVE OPTIMIZATION FOR PERFORMANCE IN SOLID STATE DRIVES BASED ON SEGMENT ACCESS FREQUENCY

(71) Applicant: Dell Products, LP, Round Rock, TX (US)

(72) Inventors: Lip Vui Kan, Hillbrooks (SG); Young Hwan Jang, Gyeonggi-do (KR)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/273,573

(22) Filed: Sep. 22, 2016

(65) Prior Publication Data

US 2018/0081569 A1    Mar. 22, 2018

(51) Int. Cl.
*G06F 12/02*    (2006.01)
*G06F 12/08*    (2016.01)
(Continued)

(52) U.S. Cl.
CPC .......... *G06F 12/0246* (2013.01); *G06F 11/34* (2013.01); *G06F 12/0868* (2013.01);
(Continued)

(58) Field of Classification Search
CPC .... G06F 3/0616; G06F 3/0611; G06F 3/0659; G06F 3/0685; G06F 12/0862;
(Continued)

(56) References Cited

U.S. PATENT DOCUMENTS

| 4,800,483 A | 1/1989 | Yamamoto |
| 5,630,093 A | 5/1997 | Holzhammer |

(Continued)

OTHER PUBLICATIONS

Munif Farhan, "Dell Precision Optimizer," Technical White paper v 2.0, Dell Technology Group, Sep. 2014, pp. 1-20.*

*Primary Examiner* — Glenn Gossage
(74) *Attorney, Agent, or Firm* — Prol Intellectual Property Law, PLLC; H. Kenneth Prol

(57) ABSTRACT

A method and information handling system, including a solid state drive (SSD) memory device having NAND flash memory and an SSD controller to execute instructions of an SSD adaptive profiling engine for random access memory (RAM) cache optimization, are disclosed. The SSD controller is configured to cache a partial flash translation layer (FTL) table in RAM including look-up addresses corresponding to LBA segments in the NAND flash memory having access counts reflecting SSD I/O operations. The SSD controller is further configured to detect an outlier LBA segment having look-up addresses in the cached, partial FTL table, wherein the outlier LBA segment has an I/O access counts at a threshold level below the mean of access counts of other LBA segments represented in the partial FTL table, and to evict the LBA segment look-up address of the outlier LBA segment from the cached portion of the FTL table. The partial FTL table may expanded to accommodate additional look-up addresses when no outlier LBA segments exist. A portion of the RAM not used for caching the partial FTL table may be used as a prefetch cache for I/O access operations.

20 Claims, 7 Drawing Sheets

(51) Int. Cl.
  *G06F 11/34* (2006.01)
  *G06F 12/0868* (2016.01)
  *G06F 12/121* (2016.01)
  G06F 12/0862 (2016.01)
  G06F 12/12 (2016.01)

(52) U.S. Cl.
  CPC ........ *G06F 12/121* (2013.01); *G06F 12/0862* (2013.01); *G06F 12/12* (2013.01); *G06F 2212/1021* (2013.01); *G06F 2212/1044* (2013.01); *G06F 2212/2022* (2013.01); *G06F 2212/466* (2013.01); *G06F 2212/502* (2013.01); *G06F 2212/6028* (2013.01); *G06F 2212/7201* (2013.01); *G06F 2212/7211* (2013.01)

(58) Field of Classification Search
  CPC .. G06F 12/0891; G06F 12/1009; G06F 12/12; G06F 2212/1036; G06F 2212/2022; G06F 2212/602; G06F 2212/69; G06F 2212/7201; G06F 2212/7211
  See application file for complete search history.

(56) References Cited

U.S. PATENT DOCUMENTS

| | | | |
|---|---|---|---|
| 9,075,733 B1 | 7/2015 | Feldman | |
| 2004/0186946 A1 | 9/2004 | Lee | |
| 2007/0016721 A1 | 1/2007 | Gay | |
| 2007/0033341 A1 | 2/2007 | Hashimoto | |
| 2008/0114930 A1* | 5/2008 | Sanvido | G06F 12/0866 711/113 |
| 2008/0162792 A1 | 7/2008 | Wu | |
| 2008/0301397 A1* | 12/2008 | Goh | G06F 12/0246 711/202 |
| 2009/0113121 A1* | 4/2009 | Lee | G06F 12/0246 711/103 |
| 2009/0300318 A1* | 12/2009 | Allen | G06F 12/0246 711/206 |
| 2010/0332730 A1* | 12/2010 | Royer, Jr. | G06F 12/0246 711/103 |
| 2011/0066899 A1 | 3/2011 | Kang | |
| 2011/0153270 A1* | 6/2011 | Hoffman | G06F 17/18 702/179 |
| 2012/0023282 A1 | 1/2012 | Rub | |
| 2012/0159040 A1 | 6/2012 | Parikh | |
| 2014/0280689 A1 | 9/2014 | Rubenstein | |
| 2014/0281167 A1 | 9/2014 | Danilak | |
| 2014/0304453 A1* | 10/2014 | Shao | G06F 12/0246 711/103 |
| 2014/0337560 A1* | 11/2014 | Chun | G06F 12/0246 711/103 |
| 2015/0169465 A1 | 6/2015 | Slepon | |
| 2015/0186270 A1 | 7/2015 | Peng | |
| 2015/0199138 A1* | 7/2015 | Ramachandran | G06F 12/122 711/103 |
| 2015/0331624 A1 | 11/2015 | Law | |
| 2015/0347026 A1* | 12/2015 | Thomas | G06F 3/0611 711/103 |
| 2016/0246726 A1* | 8/2016 | Hahn | G06F 12/0862 |
| 2016/0253123 A1 | 9/2016 | Jacob | |
| 2016/0274797 A1* | 9/2016 | Hahn | G06F 3/0605 |
| 2016/0378359 A1 | 12/2016 | Jang | |
| 2017/0024326 A1* | 1/2017 | Luo | G06F 12/1009 |
| 2017/0336981 A1 | 11/2017 | Garcia | |
| 2017/0371794 A1* | 12/2017 | Kan | G06F 12/0871 |
| 2018/0101477 A1* | 4/2018 | Kan | G06F 12/0888 |

* cited by examiner

SYSTEM AND METHOD FOR ADAPTIVE OPTIMIZATION FOR PERFORMANCE IN SOLID STATE DRIVES BASED ON SEGMENT ACCESS FREQUENCY

FIELD OF THE DISCLOSURE

The present disclosure generally relates to information handling systems, and more particularly relates to management of operation for solid state drives (SSDs) used with information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include various types of memory such as random access memory (RAM), read only memory (ROM), flash memory of a variety of types and/or other types of nonvolatile memory. An information handling system may also include one or more processing resources such as a central processing unit (CPU) or hardware or software control logic, various controllers and the like. Additional components of the information handling system may include one or more disk drives, one or more network ports for communicating with external devices as well as various input and output (I/O) devices, such as a keyboard, a mouse, touch screen and/or a video display. Controllers and drivers may also assist in operation of any of the additional components. One or more disk drives may include solid state drives such as NAND-based flash drives, NOR-based flash drives, dynamic random access memory (DRAM) based drives or similar variations as understood in the art. The information handling system may also include one or more buses operable to transmit communications between the various hardware components.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
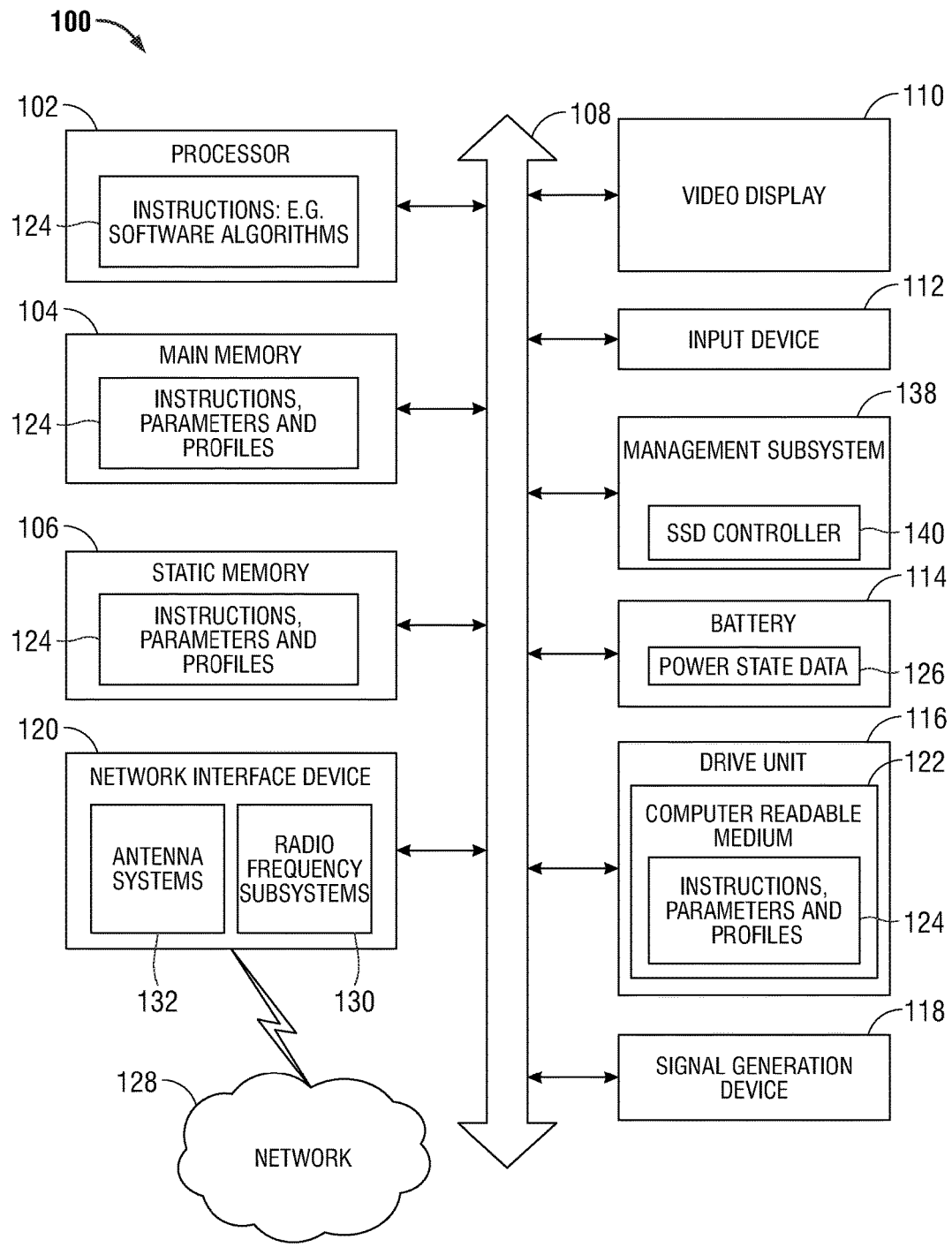
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The performance of solid state drives (SSDs) used with information handling systems (IHSs) can vary and even degrade over time. An SSD may be comprised of several components including a microcontroller, a DRAM, and some type of non-volatile memory. The non-volatile memory may include NAND flash memory and consist of several NAND flash memory packages used together to provide substantial memory capacity in some embodiments. Flash memory packages may be subject to a finite lifespan of operation resulting from wear to the NAND blocks. SSD devices may use various strategies in operation to extend endurance. One of these is wear leveling which includes address indirection using flash translation layer (FTL) tables to link logical block address requests for a memory location with a physical address in the NAND flash. This logical-to-physical address translation may enable a rotation of physical NAND flash locations to be used. Quick access to an FTL table may be required to facilitate expedient logical-to-physical address translation, so in some embodiments the SSD device may cache some or all of the FTL table in DRAM or other RAM as explained below.

Further SSDs are subject to performance variations. Some performance variation may occur with respect to rates of writing data or programming into non-volatile memory of SSDs, as well as reading data. Several strategies may be used with SSDs to improve performance as well as maximize utilization of the blocks of SSD memory. The DRAM cache associated with the SSD device, or other RAM, may be used as a data cache since RAM may respond more quickly than NAND or NOR flash memory. Further details are described herein. SSD memory may be a NAND or NOR non-volatile memory type in various embodiments. It is also understood that some of the concepts disclosed herein may be applied to either NAND or NOR or variations of these types of non-volatile memory. For purposes of illustration, embodiments herein are described for NAND solid state drives but may variously be applied to other types of non-volatile memory by those of skill in the art.

In the present disclosure, various embodiments are described for an SSD adaptive profiling engine for logical block addressing (LBA) segments to provide for RAM caching optimization for FTL table storage or for data caching for the SSD general I/O operations. In one aspect, the system or methods disclosed in embodiments herein may determine whether a full FTL table should be cached or whether portions of the memory and LBA segments are not frequently accessed such that only a partial FTL table need be cached. In another aspect of the system or methods of the embodiments of the present disclosure, the SSD controller or another processor may determine I/O access history for LBA segments to determine frequency of usage, and whether and how many LBA segment look-up addresses should be available in cache for quick access during I/O operations with the SSD. In other aspects of embodiments of the present disclosure, determination of outlier LBA segments may be analyzed to determine if usage has fallen below a level to justify caching of corresponding look-up addresses via a partial FTL table in cache. In further aspects, the system and methods of embodiments of the present disclosure may determine whether an expansion of the partial FTL table is warranted to include one or more additional LBA segment look-up addresses being used within a threshold frequency. In yet other aspect, partial DRAM or other RAM availability for data caching may be used in SSD I/O operation to enhance responsiveness and speed of SSD operation. For example, in an embodiment, pre-fetching data from a NAND or NOR flash may be stored in a DRAM pre-fetch cache to enhance responsiveness of the SSD to the host system. Algorithms for conducting the SSD dynamic optimization buffer switching are described in various embodiments herein.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device, and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the client information handling systems such tablet computers, laptop computers, smart phone systems, other mobile computing devices, servers or systems such as located anywhere within a network, including a remote data center operating virtual machine applications. The information handling system 100 may also execute instructions 124, e.g., software and algorithms such as an operating system and applications that may operate on servers or systems, remote data centers, or on-box in individual client information handling systems such as according to various embodiments herein. For clarity, instructions 124, may include software, code, instructions, or the like that may be executable via a processor or controller.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (which may include volatile (e.g. random-access memory, etc.), nonvolatile (read-only memory, flash memory etc.) or any combination thereof). Static memory 106 or drive unit 116 or both may include various types of solid state memory as understood in the art. This may include NAND flash or NOR flash memory types or some combination of both used with the solid state drive (SSD) systems and static memory systems described in embodiments herein. As an example, the SSD may further include an SSD controller 140 with onboard logic for controlling memory drive operations as well as a flash controller component for controlling one or more of the flash memory packages. The SSD system or any SSD controller logic 140 may further include on-board SRAM as well as additional DRAM for caching or other purposes as described further herein. It is understood that an SSD controller, flash controller, and any SRAM or DRAM may in some instances be integrated on one or any number of integrated circuit chips. The information handling system 100 may be a host for the SSD and connect via host interface logic as is described in some embodiments herein. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or a cathode ray tube (CRT). Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. In other aspects, a management subsystem 138 may include one or more controller circuits, such as SSD controller 140 which may execute a set of instructions 124 (shown with respect to drive unit 116) that is hard wired, firmware, or software logic implemented to perform any portion of one or more of the methods or systems disclosed in embodiments herein. For example, information handling system 100 includes, as instructions 124, one or more application programs, and Basic Input/Output System and Firmware (BIOS/FW) code. BIOS/FW code functions to initialize information handling system 100 on power up, to launch an operating system, and to manage input and output interactions between the operating system and the other elements of information handling system 100. In a particular embodiment, BIOS/FW code resides in main memory 104, and include machine-executable code that is executed by processor 102 to perform various functions of information handling system 100 including the operation of process optimization software for providing pre-fetch hint data as described in embodiments herein. In another embodiment (not illustrated), software or BIOS/FW code may reside in another storage medium of information handling system 100. For example, software or firmware code can reside in static memory 106, drive 116, in a ROM (not illustrated) associated with information handling system 100 or other memory. In other aspects, application programs and BIOS/FW code may be sourced from remote locations, for example via a hypervisor or other system, that may be associated with various devices of information handling system 100. The application programs and BIOS/FW code may be partially in memory 104, storage system 106, drive 116, or in a storage system (not illustrated) associated with network channel 120, or any combination thereof. Software application programs and BIOS/FW code can each be implemented as single programs, or as separate programs carrying out the various features as described herein. Application program interfaces (APIs) such Win 32™ API may enable application programs to interact or integrate operations with one another.

Main memory 104 may contain a computer-readable medium (not shown), such as RAM in an example embodiment. Static memory 106 may contain a computer-readable medium (not shown), such as NOR or NAND flash memory in some example embodiments. The disk drive unit 116 may include a computer-readable medium 122 such as a magnetic disk in an example embodiment. The computer-readable medium of the main memory 104, static memory 106, and drive unit 116 may store one or more sets of instructions 124 such as software code corresponding to the present disclosure.

The information handling system may also have a management subsystem 138 with a plurality of information handling system subsystems for control of a plurality of systems. For example, management subsystem 138 may interface with a variety of controllers to execute policy or enable operation of various information handling subsystems. In an example embodiment, an SSD controller 140 may access other elements such as drive unit 140 or static memory 106 shown in FIG. 1, for example, via one or more buses 108. In some aspects, system-level operation or component-level operation can be managed via the management subsystem 138.

Static memory 106 or drive unit 116 may also be managed by management subsystem 138, which may operate one or more controllers including an SSD controller 140 in an example embodiment. The SSD controller 140 may contain or access code instructions in firmware, software, or may be hard coded to execute instructions to perform any one or more of the methods or computer based functions disclosed herein. For example, information handling system 100 includes one or more sets of firmware code instructions used with the SSD controller to operate the SSD adaptive profiling engine and the various aspects of solid state drive operation including address indirection, wear-leveling, SSD I/O operations for program and read operations of data, invalidation, buffer type switching, garbage collection, write acceleration, a buffer switch counter, among other functions associated with operation of flash memory or a flash drive.

The information handling system may include a power source such as battery 114 or an AC (alternating current) power source. Battery 114 may include a smart battery system that tracks and provides power state data 126.

The information handling system 100 can also include a network interface device 120 that may be a wired network adapter or may be a wireless adapter as shown. Wireless network interface devices will include antenna systems 132 and radio frequency (control) subsystems 130 which may work in connection with the management subsystem 138. As a wireless adapter, network interface device 120 can provide connectivity to a network 128. A wired network interface is also contemplated (not shown). Radio frequency subsystems 130 and antenna systems 132 may include transmitter/receiver circuitry, wireless controller circuitry, amplifiers and other circuitry for wireless communications. Each radio frequency subsystem 130 may communicate with one or more wireless technology protocols.

In some embodiments, dedicated hardware implementations such as application specific integrated circuits (ASICs), programmable logic arrays (PLAs), such as field programmable gate arrays (FPGAs) and other hardware devices can be constructed to operate as SSD controllers to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an ASIC or an FPGA. Accordingly, the present system encompasses software, firmware, and hardware implementations.

In accordance with various embodiments of the present disclosure, the methods described herein may be implemented by firmware executed by one or more controllers or by software programs executable by a computer system. Further, in an exemplary, non-limiting embodiment, implementations can include distributed processing, component/object distributed processing, and parallel processing.

Figure 2:
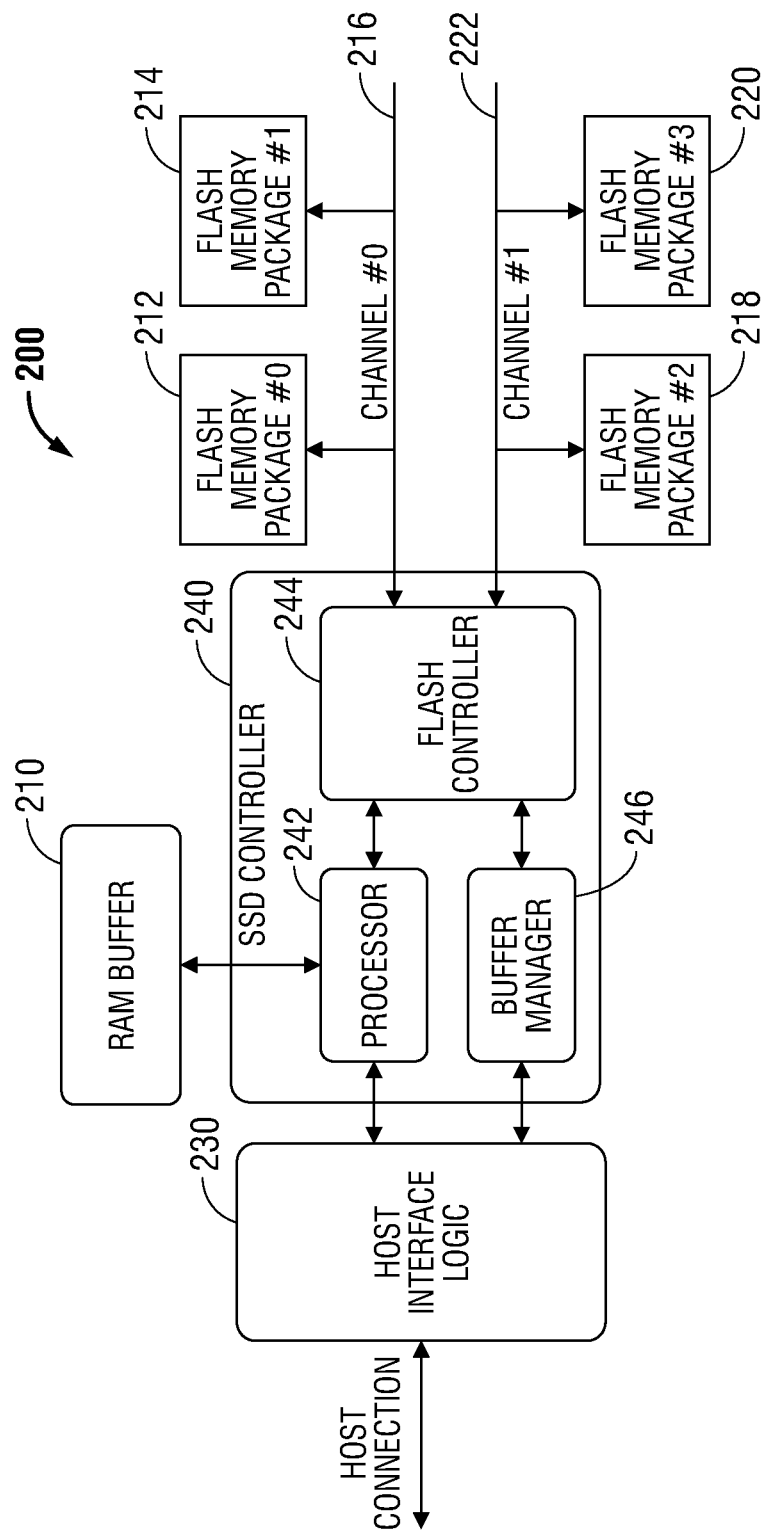
FIG. 2 is a block diagram illustrating a solid state drive (SSD) with RAM buffer according to an embodiment of the present disclosure.

FIG. 2 shows an example architecture for a solid state drive (SSD) 206 according to one embodiment of the present disclosure. SSD 206 includes an SSD controller 240 having several components. Not all components of an SSD 206 and SSD controller 240 may be shown, but for purposes of illustration, relevant components are set forth in FIG. 2. SSD controller 240 includes a processor 242 that may execute various processes including management of several SSD functions including address indirection, caching, buffering via a buffer manager 246, wear leveling, garbage collection, and other aspects of executing or improving SSD I/O operations including program writes and reads of data into flash memory received from a host device. Several example operations are listed herein and additional operation will be understood by those of skill for implementation of a functional SSD 206. SSD controller 240 may include an on-board SRAM (not shown) for various functions described above and additionally may be operatively connected to a DRAM or RAM buffer 210. DRAM buffer 210 may be an integrated DRAM or may be a DRAM circuit external to SSD controller 240. DRAM buffer 210 may be used for a variety of operations including for caching FTL tables for expedient address indirection as well as to cache pre-fetched data to expedite responsiveness of the SSD 206 to a host information handling system according to embodiments describe herein.

In another aspect, SSD controller 240 may include or be operatively coupled to a flash controller 244 which may be used to interface with and operate program, read, erase, and other operations with the NAND or NOR flash memory arrays. In the example embodiment, flash controller 244 of the SSD controller 240 interfaces with flash memory package #0 212 and flash memory package #1 214 via channel #0 216. In the example embodiment, flash controller 244 of the SSD controller 240 interfaces with flash memory package #2 218 and flash memory package #3 220 via channel #1 222. It should be understood that many more channels and packages may be implemented and that the arrangement of flash packages on channels for communications may occur in a variety of architectures. The present architecture in the embodiment examples shown in FIG. 2 is set forth for illustrative purposes and is not meant to be a limiting architecture. For example, more than two flash packages may be linked via each communication channel 216 and 222 with the SSD flash controller 244. Further, assignment numbering of flash packages across channels may be in a variety of ordering to implement available efficiencies for program or read I/O operations as understood in the art.

Additionally, SSD 206 and SSD controller 240 may be operatively connected to a host information handling system, such as 100 described above in FIG. 1, via a host interface logic 230. Host interface logic 230 may be adaptable to accommodate bus communications with the SSD 206 via a variety of bus standards understood in the art. The host interface logic 230 adapts to the bus communication protocol (e.g., PCIe, SATA, SCSI, USB, etc.) of a host system, as well as to operation with host software drivers for SSD such as Non-Volatile Memory Express (NVMe). It is understood that host interface logic 230 interface with the SSD adheres to the standards of operation associated with one or more of those protocols or standards. Examples of standard of interface operation may include implementation of NAND flash interface standards in an example embodiment such as Open NAND Flash Interface (ONFI) specifications or Joint Electron Device Engineering Council (JEDEC) related specifications for interface operations with NAND flash.

Figure 3:
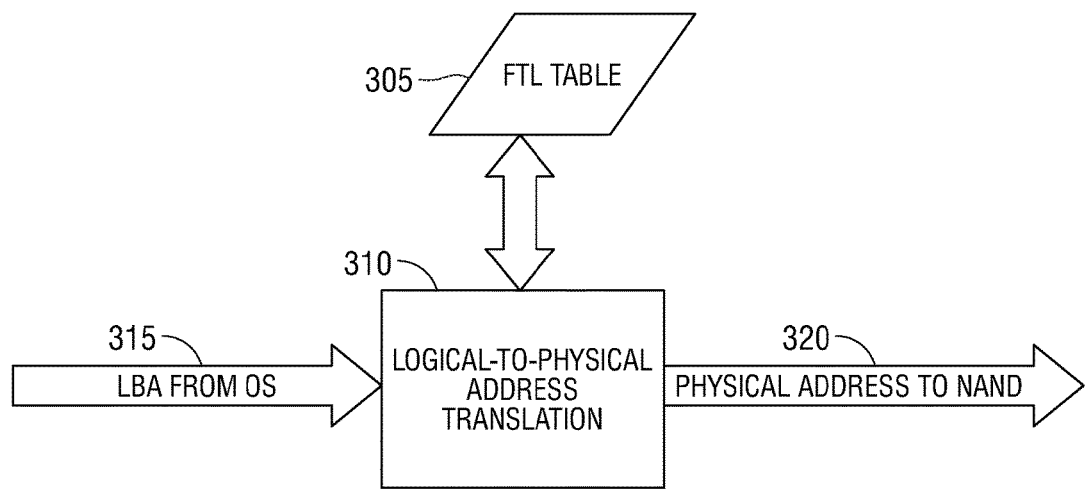
FIG. 3 is a graphic block diagram illustrating operation of an FTL table with an SSD memory according to an embodiment of the present disclosure.

FIG. 3 shows the operation of a logical-to-physical address translation 310 via a flash translation layer (FTL) table 305 according to an example embodiment. As explained above, flash memory packages may be subject to wear with usage for SSD I/O operations including programming, reads, and erase operations. The SSD devices may use address indirection for purposes of implementing wear-leveling as well as for reasons related to legacy operation of data communications with a host information handling system. Memory programming and read operations with many host information handling systems operate with respect to legacy memory or drive operations used for magnetic disk systems. This includes I/O operations of a program or read function to a logical block address (LBA) from the host operating system (OS) as shown at 315. The SSD controller executes logical-to-physical address translation 310 via an FTL table 305 to link logical block address requests for a memory location with a physical address in the NAND flash (or another type of non-volatile memory). A copy of the full FTL table is stored in the non-volatile memory. Quick access to an FTL table may be required to facilitate expedient logical-to-physical address translation, so in some embodiments the SSD device may cache some or all of the FTL table in DRAM or other RAM as explained below. DRAM responsiveness from a cached FTL would be faster than access to the FTL table stored in non-volatile memory such as NAND flash memory.

The address indirection for logical-to-physical address translation 310 of the present embodiment utilizes the FTL table 305 which is a look up table that re-directs a logical block address (LBA) received from the operating system 315 of a host information handling system to the physical address 320 in NAND memory where the data is actually stored or to be stored. To expedite access via a cached FTL table 305, the FTL table stored in flash is loaded entirely or in part into DRAM when the SSD powers up in some embodiments. In an aspect of an example embodiment, 1 megabyte (MB) is typically required to store the FTL table housing look-up addresses, metadata, and other data related to address indirection pertaining to indexing 1 gigabyte (GB) of physical addresses of flash memory. In one embodiment, a 512 GB SSD may utilize 512 MB DRAM capacity to house an FTL table.

It has been determined that in many information handling systems, such as those operating Windows® based operating systems, the data span, also referred to the data locality, utilized by the information handling system host may be a narrower window than the entirety of an SSD flash memory. In an example, it has been that data locality of a typical Windows® based information handling system is often confined to an 8 GB span. This data locality of the information handling system may often be limited to half or less of the SSD flash memory capacity. In a circumstance where the data locality is a narrower window of SSD flash memory capacity usage, a partially loaded FTL table may generate a sufficiently high hit rate to sustain SSD I/O operations with very little impact on data throughput performance of the SSD. Devoting the full capacity of the DRAM to storing a full FTL table during address indirection may be wasteful and unnecessary. With a partially loaded FTL table, remaining DRAM capacity may be dedicated to other purposes for improvement of the SSD device responsiveness and throughput and reduce SSD command latencies. In an example, pre-fetching may be used from the SSD flash packages to the DRAM to provide faster responses to read requests from an OS. A pre-fetching or other algorithm for programming or reads from SSD may be implemented in the storage driver for caching data to accelerate the storage performance. This is discussed further in embodiments below.

In an example embodiment, if the data locality span may be limited to an 8 GB span, a partially loaded FTL table of 24 MB is sufficient to generate a high FTL cache hit ratio such that throughput performance is not impacted. It is noted that for Windows® based information handling systems, 8-10 GB of span is a typical data locality for many levels of operation. However, fixing a partial FTL table caching level to a specifically smaller FTL table may be inflexible in light of a wide variety of usage scenarios likely for a general purpose information handling system, for example one with a Windows®-based OS. Certain applications may require large amounts of data access in the SSD device. When operating in some usage scenarios, the data locality span may increase significantly from, for example an 8 GB span. Hence, a flexible FTL table caching optimization method may be used. An adaptive profiling engine implemented in software, firmware, hard-coded or any combination of the same may be used to monitor data locality for an information handling system interfacing with an SSD device in an example embodiment. The adaptive profiling engine may adaptively adjust the size of the FTL table stored in cache to maintain a high cache hit ratio for the FTL table during address indirection while freeing a portion of the DRAM space for assisting the SSD I/O operational efficiency.

Figure 4:
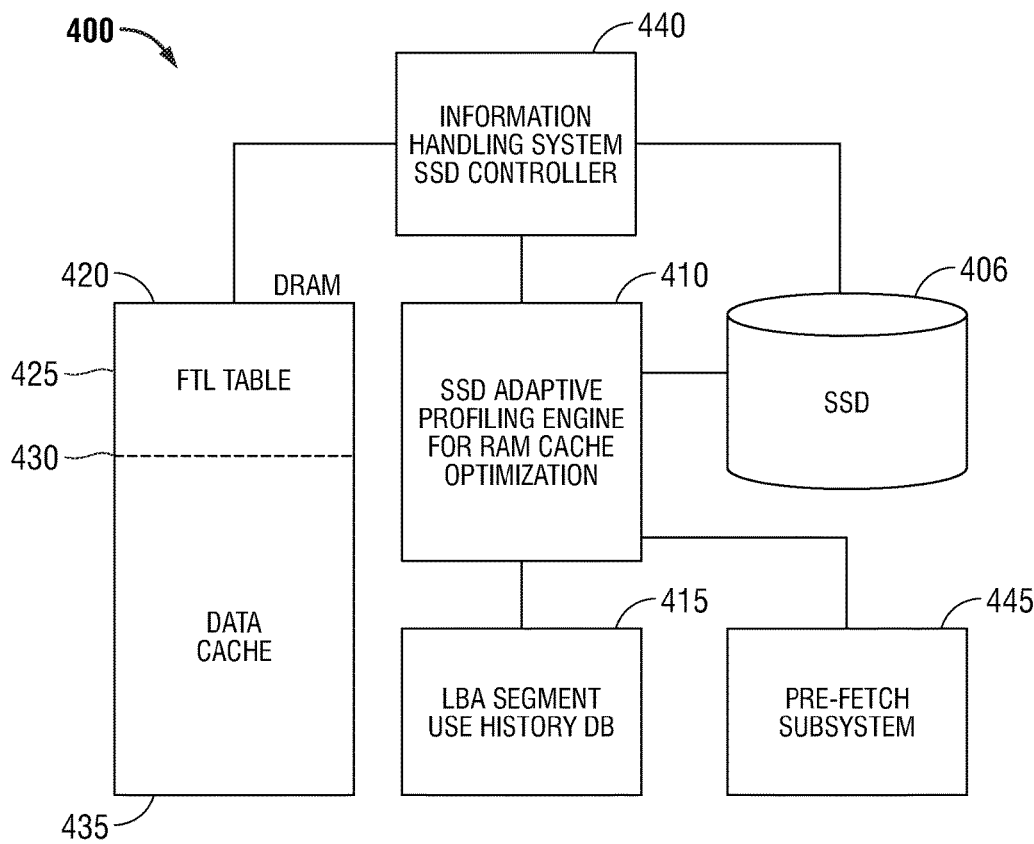
FIG. 4 is a block diagram illustrating an SSD memory device operating with an SSD adaptive profiling engine for RAM caching optimization according to an embodiment of the present disclosure.

FIG. 4 is a block diagram illustrating components 400 of the SSD adaptive profiling engine 410 for dynamic optimization of DRAM 420 usage for an aspect of the present disclosure. SSD controller 440 works in association with drivers in an information handling system host (not shown) to manage operation of the SSD device. SSD controller 440 may execute code instructions or hardwired instructions for implementing SSD I/O operations. SSD controller 440 may also execute code instructions or hardwired instructions to support SSD operation including addressing, program and read operations, invalidation, buffer type switching, garbage collection, write acceleration, wear balancing or the like.

DRAM 420 may be used for caching for all or a part of FTL table 425. In an example embodiment, a partial FTL table 425 may be cached in DRAM 420 occupying a portion of the DRAM up to a level shown at dashed line 430. The remainder of DRAM 420 may be used as a data cache 435 to support various aspects of solid state drive I/O operations. In particular, SSD I/O operations of programming and read operations may be assisted by caching some data to be throughput in DRAM 420. In an example embodiment, data cache 435 may be used for pre-fetching data from the SSD NAND flash memory 406 via execution of code instructions for a pre-fetching or pre-fetch subsystem 445. Pre-fetching subsystem 445 may work in connection with an application system optimizer program running on the host information handling system which provides data referred to herein as look-ahead hint data according to some embodiments. In at least one example embodiment, the pre-fetching subsystem 445 may be implemented in a storage driver of the SSD memory device. The look-ahead hint data may be provided from an optimizer application program running on the host such as a Dell® Precision Optimizer which may track data trees to provide an indication of potential up-coming data likely to be requested during operation of application programs on the host information handling system. This look-ahead hint data is provided to a pre-fetching subsystem 445 in some embodiments. The pre-fetching subsystem 445 may then fetch look-ahead data, indicated by the look-ahead hint data as likely to be requested in the near future from NAND flash or other flash memory, for storage in DRAM cache 435. Such an activity will expedite the SSD device responsiveness to a host information handling system.

The SSD adaptive profiling engine 410 works to keep the FTL table hit rate high from DRAM cache 420 by adaptively determining what portion of the FTL table 425 or how much of the FTL table 425 should be stored in DRAM 420. The SSD adaptive profiling engine 410 may operate to monitor the data locality span of the host I/O accesses to the SSD memory device. In some embodiments, the SSD adaptive profiling engine 410 may adaptively adjust the size of the partial FTL table providing for address translation with a high hit FTL table cache ratio. Moreover, the adaptive profiling engine 410 may monitor LBA segment usage with cached LBA segment addresses to evict infrequently accessed LBA segments from the partial FTL table if necessary in some aspects. In other aspects, LBA segment addresses may be analyzed and meet a criterion to replace evicted LBA segments in the cached, partial FTL table to enhance high FTL table cache hit ratios.

During usage of a partial FTL table 425 stored in DRAM cache 420, an FTL table cache miss will require the SSD controller 440 to swap out FTL table pages from flash thereby impacting data throughput for the SSD device 406. When SSD I/O operations, such as program or read operations, are directed to an LBA segment, a counter in the SSD adaptive profiling engine 410 will track the number of access for LBA segments and store this data in association with the LBA segment list. The methods and system of the present disclosure may maintain an LBA segment use history database 415 for tracking LBA segment accesses from received SSD I/O program or write requests. This LBA segment use history database 415 is also referred to as the historically useful LBA segments database at points herein.

The LBA segment use history database 415 may include an historic data locality span. The historic data locality span relates to the data locality span of accesses to LBA segments experienced by an SSD device since deployment in one aspect. In another aspect, the historic data locality span may also include data on the most recent data locality span updates. Updates may be periodic in some embodiments, may be conducted at shutdown of the SSD device in other embodiments, or some combination. The LBA segment use history database 415 may be stored in non-volatile memory such as a portion of flash. The historic data locality span may be used to determine the size of the FTL table that should be cached at boot up.

Additionally, the SSD adaptive profiling engine 410 may maintain a database of currently-cached LBA segment addresses in a partially cached FTL table. This database of currently-cached LBA segment address may be stored separate to or with the LBA segment user history database 415. This database of currently-cached LBA segment addresses included in a partial FTL table in DRAM would reflect a data locality span at startup to determine the size of the FTL table to be cached if a partial FTL table is to be cached, in an aspect of the present disclosure. In some aspects, the most recently updated data for an historic data locality span may be used to determine the FTL table size. In other aspects, the most recent session data locality span is used as a record of the partial FTL table previously loaded during the most recent SSD device operating session. In either case, the selection of the partial FTL table size and contents would be subject to final updates before shutdown as determined by the SSD adaptive profiling engine described herein.

During operations, session data locality span relates to the data locality span of accesses to LBA segments as experienced by an SSD device since the last power up. The SSD adaptive profiling engine 410 actively monitors the data locality span and SSD I/O access counts and updates the session data locality span and the currently-cached LBA segment addresses with incremented LBA segment access counts when SSD I/O operations are received. The currently-cached LBA segment addresses and session data locality span may be used to determine if any outlier LBA segments have unnecessarily cached addresses in the partially cached FTL table that are not frequently accessed. This may be conducted by the SSD adaptive profiling engine according to several embodiments described herein. Outlier LBA segment look-up addresses may be evicted from the partially cached FTL table. An analysis of LBA segment use of non-cached LBA segment addresses may yield a highly accessed LBA segment for which the look-up address should be substituted into the partially cached FTL table in some embodiments. In other embodiments, the SSD adaptive profiling engine 410 may determine that the size of the DRAM reserved for the partially cached FTL table may need to be expanded to include other frequently accessed LBA segment look-up addresses when an FTL table cache miss is encountered.

The LBA segment use history database 415, including the historic data locality span, may be updated at various points of operation of the SSD adaptive profile engine according to some embodiments. In one aspect, updating the LBA segment use history database 415 may occur after adjustments or expansion to a partially cached FTL table. In another aspect, the LBA segment use history database 415 may be updated upon shutdown, or at other points.

Ongoing access counts for LBA segment I/O accesses may be tracked in a session data locality span file. The session data locality span may be stored in a local buffer or in another location accessible by the SSD controller during operation. The session data locality span may also be updated and stored with the LBA segment use history database 415 in some embodiments.

The SSD controller 440 may be linked along with SSD flash memory 406 to a host information handling system (not shown). SSD flash memory 406 may be comprised of a plurality of flash memory packages operatively coupled to SSD controller 440 via one or more channels according to an embodiment of the present disclosure. The information handling system SSD controller 440 may execute firmware code, in one example embodiment, to operate an SSD adaptive profiling engine 410 for tracking SSD I/O operations directed to various LBA segments of memory. Tracking the SSD I/O operation accesses assists in determining data locality of LBA segment usage. Further, cross referenced with address indirection operations, the data locality spans may also track SSD flash memory physical locations used. The SSD adaptive profiling engine 410 may use this tracking of SSD I/O operations and data locality determination to establish optimized use of a RAM cache such as DRAM 420 as described in embodiments herein. The SSD adaptive profiling engine 410 will also determine whether to cache all or part of the FTL table in some embodiments. In other aspects, the SSD adaptive profiling engine 410 may determine how much of a partial FTL table should be cached and which LBA segments should have look-up addresses cached according to some embodiments. Additional details of algorithms describing the operation of the SSD adaptive profiling engine 410 according to various embodiments are discussed further herein.

Figure 5:
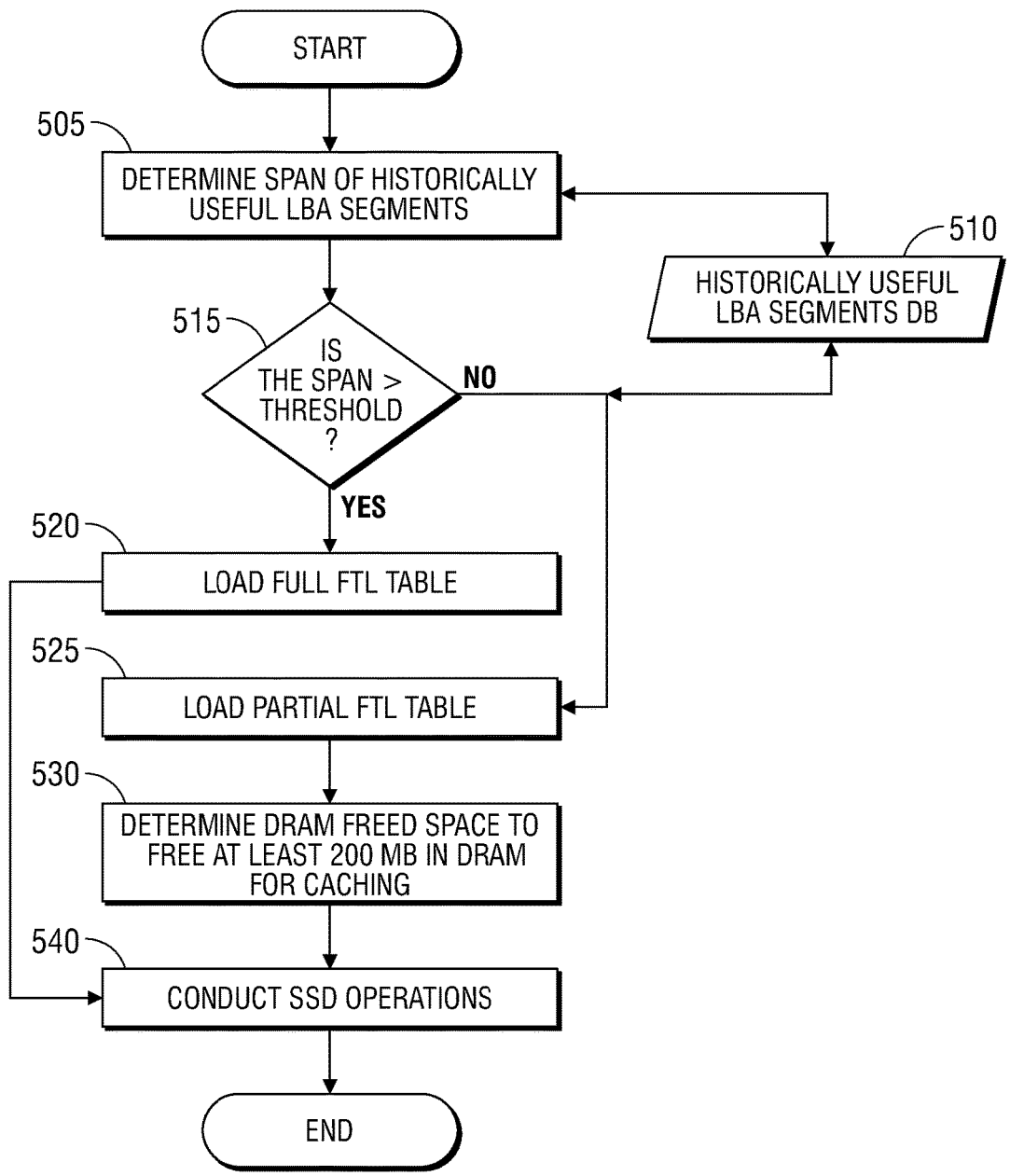
FIG. 5 is a flow diagram illustrating a method of initializing DRAM caching in an SSD memory device according to an embodiment of the present disclosure.

FIG. 5 is a flow chart showing an execution of code for an SSD adaptive profiling engine upon initialization or start-up of an SSD device with a host information handling system. Flow begins at 505 where upon the initialization of the SSD, the SSD controller may access the LBA segment use history database 510 to determine the historical data locality span of LBA segments. In some embodiments, the historical data locality span may reflect a most recently used set of cached LBA segment addresses in a partially cached FTL table. In other embodiments, the historical data locality span of LBA segments may include data updates to LBA segment accesses tracked according to embodiments herein and provided on a previous shut down. These updates may alter the set of LBA segment addresses in the partial FTL table to be cached. In certain embodiments, the historical data locality span of LBA segment usage is continuously or periodically updated with SSD I/O access counts to update statistics on used LBA segments. One or more of the algorithms herein may be used to also update the list of cached LBA segment addresses cached in the partial FTL table based on the current access counts. In the present embodiment at 505, the SSD controller and SSD adaptive profiling engine may determine upon startup, the span of historically useful LBA segment addresses as the selected portion of an FTL table to be cached.

Proceeding to 515, the SSD adaptive profiling engine may operate to compare the size of the span of historically useful LBA segments to the size of the overall SSD NAND flash capacity in one embodiment. The SSD adaptive profiling engine makes this comparison to determine how large the span of historically useful LBA segments is relative to the overall NAND flash capacity. This comparison may yield a percentage of how much of the SSD NAND flash capacity is accessed frequently according to the span of historically useful LBA segment data. The percentage of the overall NAND flash capacity that is included in the span of historically useful LBA segments may be compared to a threshold level of NAND flash capacity usage. The threshold level of NAND flash capacity usage is used to determine whether a full FTL table or a partial FTL table is to be loaded into DRAM according to the present embodiment. If a large percentage of the overall NAND flash capacity is accessed with some frequency, the large size of the partial FTL table may justify simply loading the full FTL table to avoid all FTL table cache misses. However, a large partial FTL table in cache would not free up a substantial amount of DRAM data caching for the benefit of SSD facilitating operations such as pre-fetch caching as described herein.

In an example embodiment, a threshold level may be set at 40% of NAND flash capacity for a span of historically useful LBA segments. It is understood that in other embodiments any percentage may be selected. For example, threshold percentage may be selected from any percentage from 30% to 80%, above which a full FTL table may be loaded into cache. In some embodiments, this threshold may be adjustable. In an example embodiment, the threshold percentage may be set by a system administrator.

There is a relationship between the size of the historically used LBA segment span for locations in physical NAND flash memory and the size of the partial FTL table having addresses corresponding to the historically used LBA segment span. Similarly, there is a relationship between the size of the overall available NAND flash memory and the size of the DRAM used for FTL table caching and other purposes. For example, the overall size of the DRAM cache designated for FTL table caching may typically be a factor of about 1000× smaller than the size of the overall NAND flash memory capacity of the SSD device in some embodiments. Similarly, the size of a partial FTL table to occupy a DRAM cache may be approximately a factor of 1000× smaller than the size of NAND flash capacity associated with those corresponding LBA segments represented in the partial FTL table. The relationship will understandably depend on the size of FTL look-up data and metadata used for association in address indirection operations. Accordingly in some embodiments, the threshold at 515 may be a percentage of DRAM that would be occupied by a partial FTL table corresponding to a span of historically useful LBA segments rather than a percentage of LBA segments in the NAND flash.

The threshold percentage may also be selected based on how much of the DRAM may be freed up for data caching if a partial FTL table is loaded. That percentage may be selected based on considerations of whether the amount of freed DRAM for data caching purposes balances relative to the risk of FTL cache misses which may cause delay in SSD device operations. At some level, a decision is made that the risk of FTL cache misses is too high and a full FTL table needs to be cached because of a wide span of historically useful LBA segments for SSD device operations. In an example embodiment, a threshold percentage may be a minimum of 200 MB must be freed for data caching from a DRAM. If 200 MB is the criteria, then a percentage of FTL table size would be based on the overall size of the DRAM available for caching. In one example embodiment, a DRAM may be 512 MB. The minimum amount that must be freed would depend on the operations to be used with the DRAM data caching. The minimum amount to be freed could be any amount and would be reflected in the percentage threshold for the size of an FTL table selected for 515, above which a full FTL table will be loaded into DRAM cache.

With each example at 515, the threshold may be used to determine whether to load either a full FTL table or a partial FTL table. Considerations of a FTL table cache miss relative to freed DRAM capacity are used to determine a threshold level. It may be appreciated that any threshold level may be used, and the threshold level may be based on similar measurements related to DRAM cache capacity or overall NAND flash capacity as described.

If the span of historically useful LBA segments as a percentage of the NAND flash capacity is greater than a threshold level at 515, flow may proceed to 520 and the SSD adaptive profiling engine may determine to load a full FTL table into DRAM cache. Flow then proceeds to 540 where the SSD device may conduct normal SSD operations using the fully loaded and cached FTL table. At this point the process may end.

If the span of historically useful LBA segments as a percentage of the NAND flash capacity is not greater than a threshold level, flow may proceed to 525 and the SSD adaptive profiling engine may determine to load a partial FTL table into DRAM cache. The partial FTL table may be selected for look-up addresses that correspond to the span of historically useful LBA segments 510.

Flow may proceed from 525 to 530 where it is determined how much DRAM has been freed up for data caching operations by loading only a partial FTL table. This amount of freed up DRAM space may then be designated for data caching activity to assist the operation of the SSD device. In one example embodiment, the SSD adaptive profiling engine may determine if a minimum level of DRAM has been freed for data caching purposes. In some embodiments, a minimum amount of available data caching may be required to implement certain SSD device operations. In one example embodiment, the freed up DRAM space may be allocated for pre-fetching if a minimum amount of DRAM space is determined to be available. In the shown embodiment of 530, this minimum may be at least 200 MB of DRAM made available after the loading of a partial FTL table. This determination may be used to decide what types or what level of SSD device enhancements may be used with the freed up DRAM data cache. Pre-fetching or other SSD enhancement operations may require differing minimum amounts of data caching as is understood.

Flow then proceeds to 540 where the SSD device may conduct normal SSD operations using the partially loaded cached FTL table and the freed up DRAM data cache. At this point the process may end.

Figure 6:
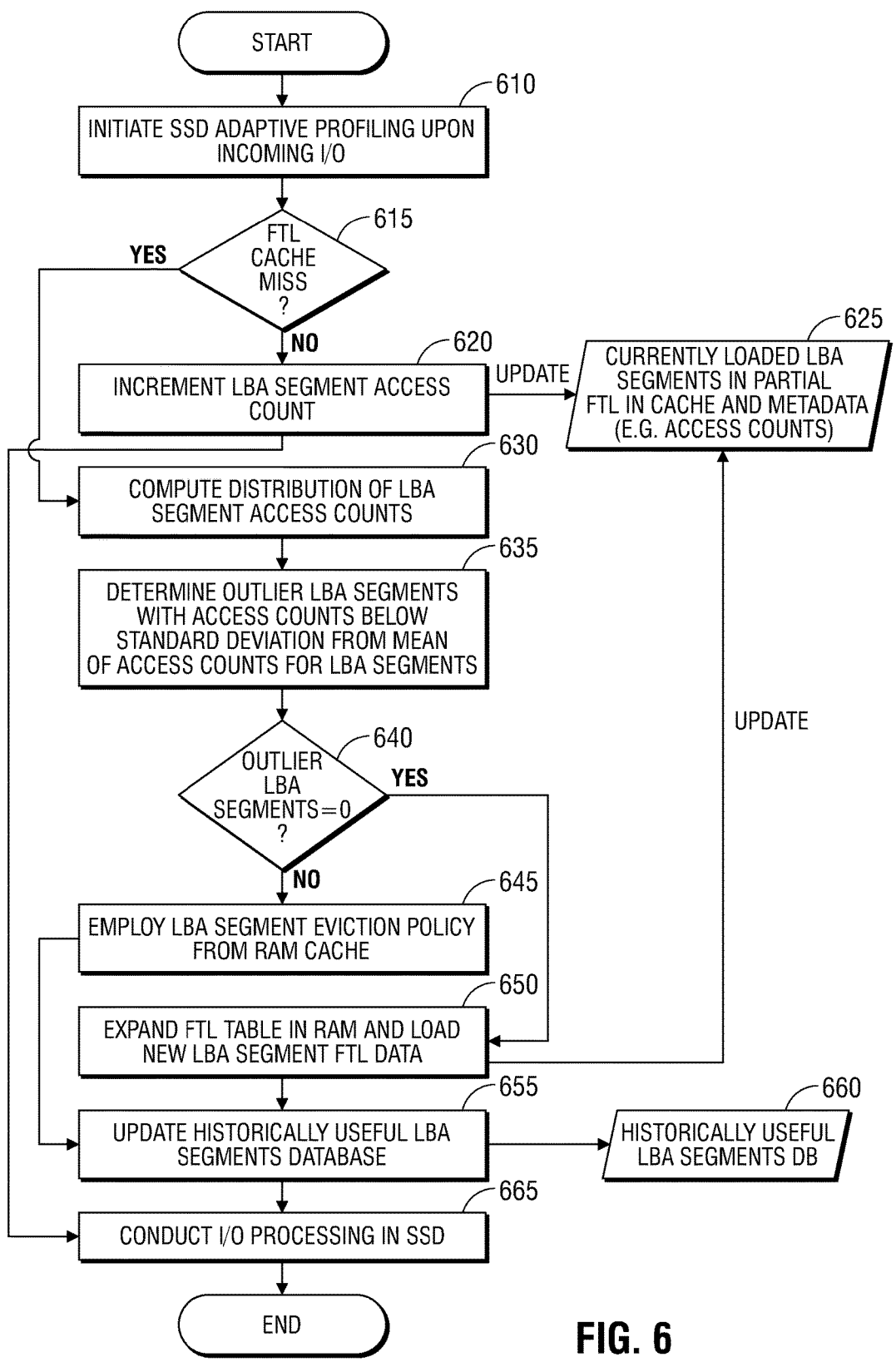
FIG. 6 is a flow diagram illustrating a method of operating the SSD adaptive profiling engine according to an embodiment of the present disclosure.

FIG. 6 is a flow chart showing operation of the SSD adaptive profiling engine to determine outlier LBA segments with addresses in a loaded partial FTL table during SSD device operation according to an example embodiment. Aspects of SSD device operation may include establishing a memory mapping structure, initializing algorithms for wear balancing, garbage collection, write acceleration, error correction, write or read operations, bit per cell structure, and other SSD functions as appropriate.

In an aspect of the present disclosure, adaptive profiling is conducted during operations via execution of a code algorithm by the SSD controller. These adaptive profiling code algorithms are prepared along with the SSD and SSD controller in firmware or hard coded wiring in some embodiments. The SSD device and SSD controller may be initialized when they are powered up with activation of a host information handling system in some embodiments. At such a time, the adaptive profiling engine may be initialized in preparation for conducting adaptive profiling operations.

Proceeding to 610, the SSD controller may begin adaptive profiling operations with the SSD adaptive profiling engine upon receiving an incoming I/O operation in some embodiments. In other aspects, adaptive profiling operations may be initiated at other points such as immediately upon SSD start up or after an I/O operation has been completed. It is understood that several initiation events may trigger the adaptive profiling operation and one example embodiment is shown in FIG. 6.

At 615, the SSD controller determines whether an FTL table cache miss in the DRAM has been detected. If no FTL table cache miss is detected, flow proceeds to 620 where the SSD adaptive profiling engine increments an access count for the LBA associated with the received I/O operation. A session data locality span database is updated with LBA access counts at 625. Such LBA access count data may be initially stored as data associated with the LBA addresses in a database of session data locality span. In some aspects, the session data locality span reflects the currently-loaded LBA addresses in the partial FTL table cached in the DRAM as shown at 625. In one aspect, metadata associated with LBA addresses in the session data locality span may be used to store ongoing access counts. Further, in other aspects, the LBA segment use history database will be updated periodically or continuously with the access count information. This updating may be directly or via session data locality span metadata that is stored locally. The access counts of LBA segments having addresses loaded with the partial FTL table are compared with the wider range of LBA segments according to embodiments described herein.

After the access counts have been incremented, and upon no FTL table cache miss being detected for an I/O operation, flow proceeds to 665 whereby the SSD device and SSD controller conduct regular I/O processing as understood by those of skill in the art. The adaptive profiling has tracked I/O operations and access for LBA addresses in the SSD device. At this point the process may end since the partial FTL table in cache is working within the identified historical data locality span of operations for the SSD device.

If a cache miss is detected at 615 however, flow proceeds to 630. Although not shown, the LBA segment access count would be incremented for the LBA segment address not currently loaded with the partial FTL table. This access count data associated with an LBA segment that is not part of the current session data locality span may be stored with updating the LBA segment usage history database in one embodiment.

At 630, the adaptive profiling engine initiates a comparison of the distribution of LBA segment access counts. In one embodiment, the initial comparison is a distribution of the session data locality span of LBA addresses and their access counts. For example, the ongoing access counts for those LBA addresses loaded in the partial FTL table cache are statistically compared via a distribution of the access counts. A cache miss requires the SSD controller to also access the access counts for the full FTL table. The remainder of the FTL table may be stored in non-volatile NAND memory. Access of the NAND memory is slower in response and, accordingly, less responsive for address indirection operations for the incoming I/O operations. Thus, adaptive profiling reviews the cache hits for the partial FTL table to determine if any LBA addresses in the partial FTL table are outliers with low levels of I/O access counts. The adaptive profiling engine determines the outlier LBA addresses in the partial FTL table for the purpose of removal or replacement. By profiling the accesses of the LBA segments whose look-up addresses are cached in the partial FTL table and determining replacement or removal, efficient use is made of the DRAM for the partial FTL table. The loaded partial FTL table in cache will maintain a high hit ratio and avoid swapping FTL pages in and out of NAND.

Proceeding to 635, the adaptive profiling engine will determine outlier LBA segments with low access count levels that are included in the partial FTL table. In an example embodiment, the adaptive profiling engine establishes the mean of the access counts associated with loaded LBA addresses in the partial FTL table. Then individual LBA access counts associated with each of the loaded LBA addresses are statistically compared to the mean access count level. The adaptive profiling engine determines if any LBA segment access counts fall below a statistical deviation below the mean access count level. Those that fall more than the statistical deviation level below the mean may be designated as outlier LBA segments. In an example embodiment, a statistical standard deviation of 1σ, 2σ or 3σ below the mean may be used to determine that the access counts associated with a loaded LBA address qualify as an outlier. It is understood that any deviation threshold may be used to determine an outlier level of access counts for a cached LBA address in a partial FTL table below a mean access count level. Determining an outlier access count level for a loaded LBA address may indicate that that LBA segment has fallen outside the data locality span either for a session of SSD operation or, over the historical operation, that LBA segment is not accessed with frequency any longer.

At 640, the adaptive profiling engine determines whether any outlier LBA segments have been determined for the currently-loaded LBA addresses in the cached, partial FTL table. If no outlier LBA segments have been determined at 640, according to the analysis at 635, the adaptive profiling engine determines whether the portion of DRAM designated to cache the partial FTL table should be expanded to include additional LBA addresses, according to one example embodiment. At 650, the adaptive profiling engine will search the historical LBA usage database to select one or more LBA addresses outside the session data locality span with higher access count levels to be included in the cached, partial FTL table. In an example embodiment, the threshold for inclusion in the expansion of the partial FTL table to be cached may be those LBA addresses with access counts falling within the statistical deviation from the mean used above in the example embodiment or determination 635. In another aspect, after the partial FTL table is expanded, the adaptive profiling engine may make a determination of whether the size of the partial FTL table to be cached has increased above the threshold level such that it would be better to load the full FTL table into cache, as in the example of FIG. 5. Although this aspect is not shown in FIG. 6, it could be implemented in an example embodiment along with the method of FIG. 6 upon a determination to expand the partial FTL table to be loaded into RAM cache as will be understood by those of skill in the art.

Other embodiments may not call for expansion of the designated DRAM partial FTL table cache. In these latter embodiments, upon determining that no outlier LBA segments have been identified, flow may proceed directly to 655 without expansion of the partial FTL table with newly identified LBA look-up address data as in 650.

Flow proceeds to 655 to update the LBA segment use history database, or historically useful LBA segments database (DB), 660 to reflect the current levels of access counts and the session data locality span inclusion of some LBA segments. At 665, the SSD device and SSD controller will conduct regular I/O processing and at this point the process may end.

If at least one outlier LBA segment has been determined at 640—according to the analysis at 635, the adaptive profiling engine implements the LBA segment eviction policy at 645—to remove outlier LBA addresses from that the portion of DRAM designated to cache the partial FTL table. In one aspect, if no other LBA addresses would be called to replace an evicted outlier LBA address, the adaptive profiling engine may shrink the portion of DRAM designated for partial FTL table caching. In another aspect, the adaptive profiling engine may analyze LBA segments outside the session data locality span including currently-loaded LBA segment addresses in the partial FTL table. These outside LBA segment addresses are reviewed for levels of I/O access counts meeting an FTL table inclusion threshold. If an LBA segment has access counts sufficiently high, such an LBA segment address may replace the evicted outlier LBA address. In an example embodiment, the adaptive profiling engine may determine if the outside LBA segment not currently loaded with the partial FTL table has access counts above the inclusion threshold. In one example embodiment, the inclusion threshold of access counts are at or above the level of the statistical deviation threshold below the mean access counts described above for eviction from the partial FTL table. A different inclusion threshold from the eviction threshold may also be used as understood by those of skill in the art. For example, a higher inclusion threshold may be used to reduce swapping frequencies or to reduce the likelihood of needing to expand the size of the partial FTL table in cache.

In at least one example, if more outside LBA segments are determined to be above the inclusion threshold for the partial FTL table than LBA segments are evicted, it is understood that flow may proceed to 650 to determine expansion of the FTL table cache size in accordance with the description above for the excess outside LBA segments (not shown in FIG. 6). Additional outside LBA segments above the number evicted will cause the adaptive profiling engine to adapt the size of the FTL table DRAM cache. In an embodiment, it is further understood that the SSD adaptive profiling engine may determine that the adjusted FTL table cache size may exceed the span threshold described in the embodiment of FIG. 5. Accordingly, this could trigger loading the entire FTL table into DRAM as described in the embodiment of FIG. 5 (and also not shown in FIG. 6).

Flow may proceed to 655, where the historical LBA segment usage history database 660 is updated to reflect the current levels of access counts and the currently loaded LBA addresses in DRAM cache. At 665 the SSD device and SSD controller conducts regular I/O processing, and at this point the process may end.

It should be understood that the method recited above may occur in any order, and that operations or steps may occur simultaneously. Moreover, certain steps of the method not recited or recited in other example embodiments herein may be combined and conducted as understood by those of skill in the art. Further, not all aspects of the methods of FIG. 5 and FIG. 6 need be performed in all embodiments contemplated. For example, conducting pending SSD operations, such as I/O operations, need not wait for other steps of adaptive profiling to be performed and may instead operate simultaneously or may occur before operations of the adaptive profiling engine described in the several embodiments described herein.

Figure 7:
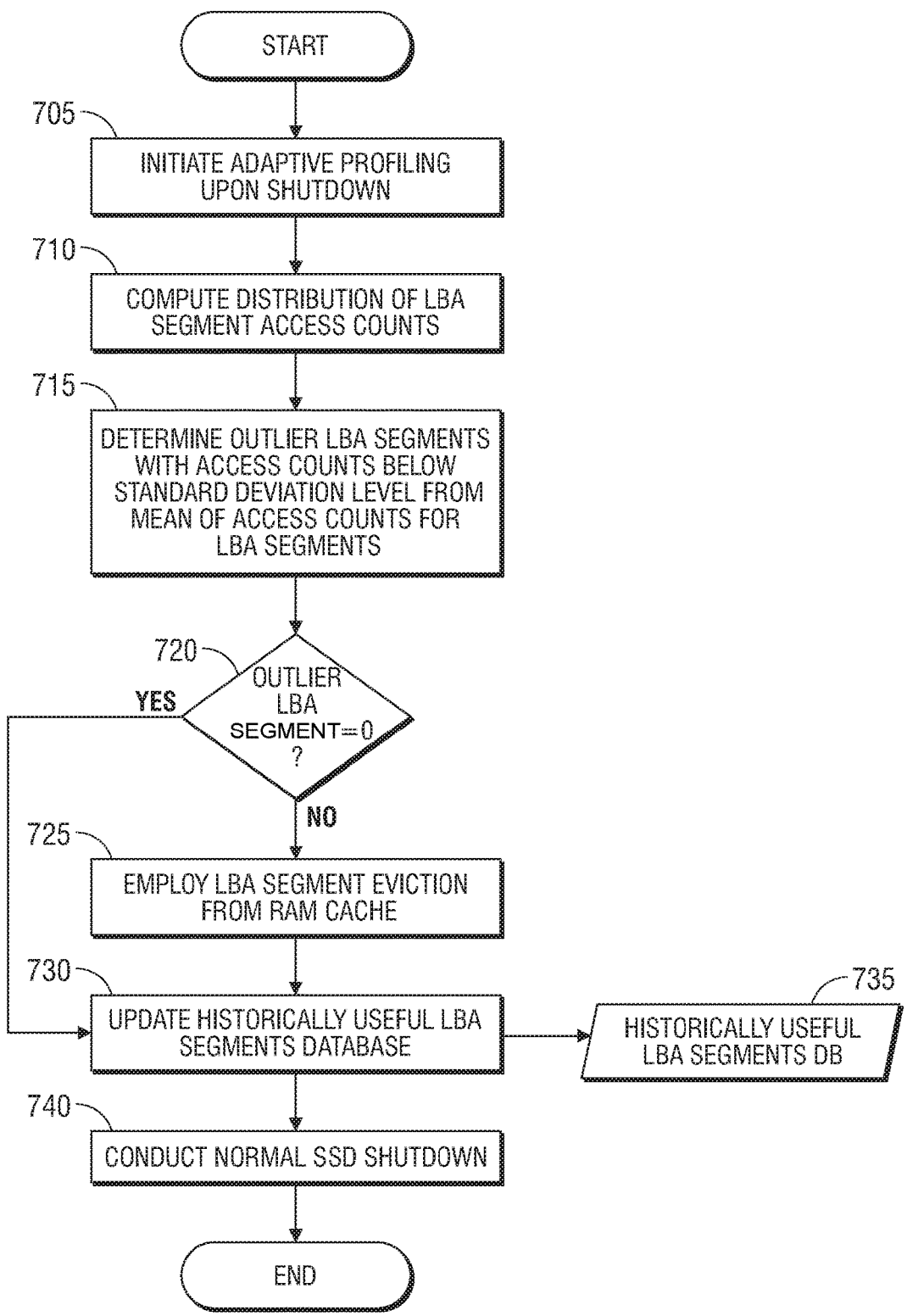
FIG. 7 is a flow diagram illustrating another method of operating the SSD adaptive profiling engine according to an embodiment of the present disclosure.

FIG. 7 is a flow chart showing operation of the SSD adaptive profiling engine to determine outlier LBA segments with addresses in a loaded partial FTL table during SSD device operation according to another example embodiment. In another aspect of the present disclosure, portions of the adaptive profiling operation are conducted after regular SSD operations and before SSD device shutdown. The adaptive profiling engine may be executed via a code algorithm initialized at the SSD controller. These adaptive profiling code algorithms are available with the SSD device and SSD controller in firmware or hard coded wiring in some embodiments. The adaptive profiling engine are initialized upon shut down of a host information handling system in some aspects of the present embodiment.

Proceeding to 705, the SSD adaptive profiling engine is initiated upon the SSD controller receiving an indication of the SSD device being shut down in some embodiments. In other aspects, adaptive profiling may be initiated at other points such as upon SSD start up or after an I/O operation has been completed as described above. It is understood that several initiation events may trigger the adaptive profiling.

At 710, the SSD controller executing instructions of the adaptive profiling engine initiates a comparison of the distribution of LBA segment access counts. The comparison may initially be conducted for the session data locality span of LBA look-up addresses including the currently-loaded partial FTL table in cache and their corresponding access counts. In one aspect, the loaded LBA addresses in the partial FTL table cache are surveyed for access counts and statistically compared via a distribution of these access counts.

Proceeding to 715, the adaptive profiling engine will determine outlier LBA segments with low access count levels that have addresses included in the cached, partial FTL table. In an example embodiment, the mean of access counts associated with loaded LBA addresses in DRAM cache for the partial FTL table are determined. Then SSD adaptive profiling engine determines if there is a statistical deviation below the mean access count level for the individual LBA access counts associated with each of the loaded LBA addresses. In an example embodiment a statistical standard deviation of $1\sigma$, $2\sigma$ or $3\sigma$ below the mean may be used to determine that the access counts associated with a loaded LBA address qualifies as an outlier. It will be understood that any deviation threshold may be used to determine an outlier level of access counts for a cached LBA address below a mean access count level. Determining an outlier access count level for a loaded LBA address may indicate that that LBA segment has fallen outside the session data locality span and may no longer be usefully cached in the partial FTL table.

At 720, the adaptive profiling engine determines whether there are any outlier LBA segments within the currently-loaded LBA addresses in the cached, partial FTL table. If no outlier LBA segments have been identified at 720, flow then proceeds to 730 to update the LBA segment usage history or historically useful LBA segments database 735 to reflect the current levels of access counts and the session data locality span update. At 740, the SSD device and SSD controller will conduct normal shut down operations and at this point, the process may end.

In another embodiment, the adaptive profiling engine may determine that the portion of DRAM designated to cache the partial FTL table should be expanded to include additional LBA addresses if no outlier LBA addresses are identified. This embodiment is not shown in FIG. 7, but is described with respect to FIG. 6. The adaptive profiling engine may search the historical LBA usage database to select one or more LBA addresses outside the session data locality span that has higher access count levels. Those LBA address may be included in the cached, partial FTL table if their access count levels fall within the statistical deviation from the mean of LBA access count levels for cached LBA addresses as described above. Then the SSD controller may designate additional DRAM cache space to accommodate the larger partial FTL table to be cached during the next session of SSD device operation. The session data locality span may be updated in the LBA segment use history database 735 to reflect this expansion. In a further embodiment, after the partial FTL table is expanded, the adaptive profiling engine may determine upon the next start up of the SSD device whether the size of the partial FTL table to be cached has increased above the threshold level such that it would be better to load the full FTL table in to cache as in the example of FIG. 5 and embodiments described herein.

If at least one outlier LBA segment has been determined at 720, the adaptive profiling engine implements the LBA segment eviction policy at 725, to remove outlier LBA address from that the portion of DRAM designated to cache the partial FTL table. If no other LBA address should be called to replace an evicted outlier LBA address, the adaptive profiling engine may shrink the portion of DRAM designated for partial FTL table caching. In another aspect, the adaptive profiling engine may analyze LBA segments outside the session data locality span for addresses of currently-loaded LBA segments in the partial FTL table. The SSD adaptive profiling engine will review levels of I/O access counts for these outside LBA segments not in the partial FTL table. If an LBA segment has access counts sufficiently high, such an LBA segment address may replace the evicted outlier LBA address. The SSD adaptive profiling engine will add that LBA address to the partial FTL table to be loaded into DRAM cache upon next start up. In an example embodiment, the adaptive profiling engine may determine if the replacement LBA segment for the evicted LBA address has access counts above the statistical deviation threshold below the mean access counts for inclusion in the partial FTL table of LBA segment addresses. In other aspects, if several additional outside LBA addresses have sufficiently high I/O access counts, the SSD adaptive profiling engine may determine to expand the size of the cached FTL table in accordance with embodiments described herein.

Flow may proceed to 730, where the LBA segment usage history or historically userful LBA segments database 735 is updated to reflect the current levels of access counts and the current LBA addresses to be loaded in cache as a partial FTL table reflecting a useful data locality span during the next start up. At 740, the SSD device and SSD controller conduct regular shut down operations and at this point the process may end.

It should be understood that the method recited above may occur in any order or aspects of the present disclosure such as operations or steps may occur simultaneously. Moreover, certain steps of the method not recited or recited in other example embodiments herein may be combined and conducted as understood by those of skill in the art. Further, not all operations or steps of the method of FIG. 7 need be performed in all embodiments contemplated. For example, conducting some or all SSD shutdown operations need not wait for other steps of adaptive profiling in FIG. 7 to be performed and may instead operate simultaneously or may occur before operations of the adaptive profiling engine described in FIG. 7.

Figure 8:
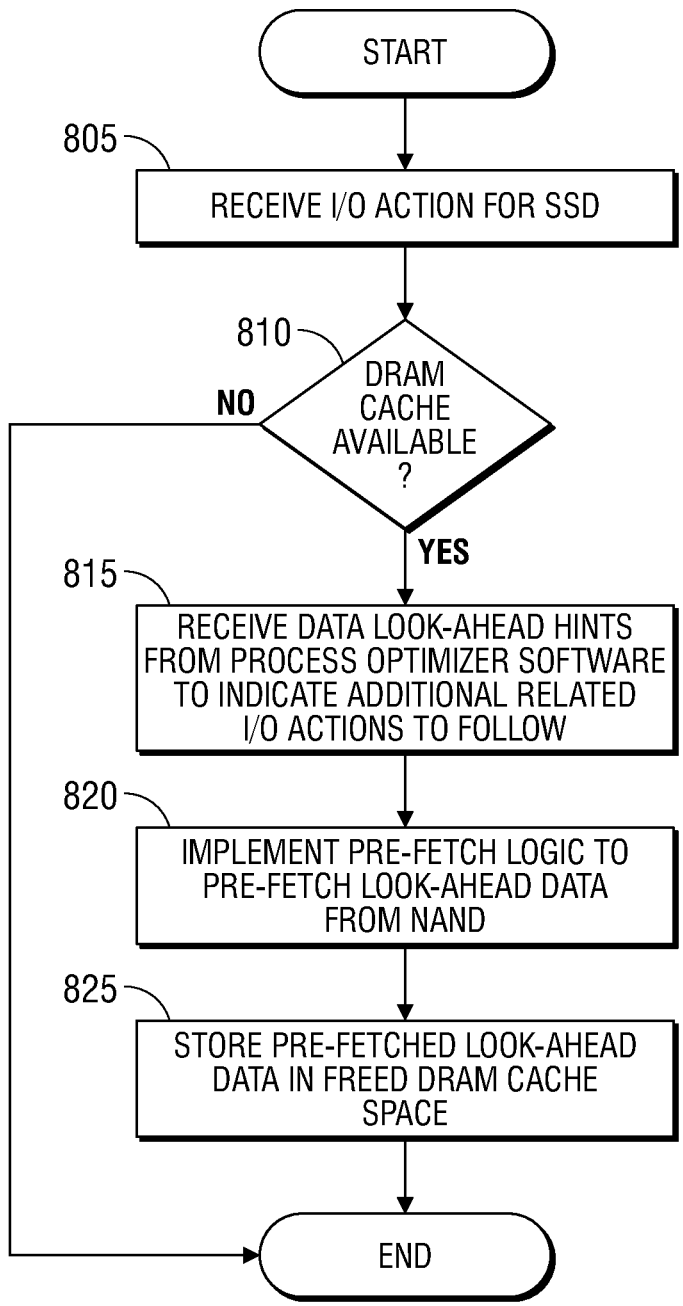
FIG. 8 is flow diagram illustrating operation of an SSD DRAM pre-fetch cache system according to an embodiment of the present disclosure.

FIG. 8 is a flow chart showing the SSD pre-fetch operation using DRAM cache space freed by loading only a partial FTL table according to one example embodiment. Flow begins at 805 where the host initiates an I/O command or action for the SSD, such as a program write or read operation, which is received at the SSD. At 810, the SSD pre-fetching subsystem will determine if DRAM cache is available for pre-fetching activities. If not, the process may end since the DRAM cache is occupied by the entire FTL table. Thus, pre-fetching may not be conducted.

If cache space is available for storage of pre-fetched data, flow proceeds to 815. At 815, the SSD pre-fetching subsystem is activated and establishes correspondence with process optimization software operating on the host information handling system. In an embodiment the process optimization software may be an application running on a host that operates on top of an operating system to assist with pre-fetching and other processes. An example embodiment is Dell® Process Optimizer software which may track operations of the central processor during execution of application programs by the host.

The process optimization software may transmit look-ahead hints to the SSD controller relating to probable LBA accesses that could be received. In one example embodiment, the look-ahead hints may be generated when the process optimization software monitors the file system of the information handling system executing an application program. The look-ahead hint data may indicate SSD locations for additional related I/O actions in one example embodiment. By way of one example, when a file is being opened relating to an application program, there are often a series of related files that will follow initial file execution for the application. The process optimization software may monitor the file system including the accessing and loading the file structure for a program file associated with an application. Detection of several pointers relating to files to be accessed in the file structure are determined to correspond to SSD locations. Look-ahead hint data relating to these pointer locations may be sent to the SSD device for interpretation as anticipated accesses locations of LBA segments.

In another example embodiment, the process optimization software may track a list of favorite programs based on user designation or tracked user trends. For example, the process optimization software may determine from usage trends that a user frequently opens up certain programs upon start up of the system. In an example, those frequently opened application programs may be an email management system, a calendar management system, a photo management system, a word processor or the like. Also, often these application programs will utilize a discrete data locality span for accesses within an SSD device as described above. File pointers may be determined from this favorites list of application programs.

The pre-fetching subsystem may then receive look-ahead hint data relating to the pointers for these anticipated LBA segments. The look-ahead hint data corresponds to data to be retrieved from the SSD NAND memory locations, such as one or more LBA segments that are hinted at for upcoming I/O accesses. The data in these predicted upcoming memory locations may be referred to as look-ahead data. At 820, the prefetch logic is implemented to prefetch look-ahead data from NAND. At 825, the pre-fetch subsystem may access the look-ahead data pre-fetched from the corresponding anticipated LBA segments in NAND, and store the look-ahead data in the DRAM cache space made available by caching only a partial FTL table. A pre-fetching table used by the SSD controller may then direct the I/O accesses for these pre-fetched files to the DRAM cache locations instead of the SSD NAND locations. This will thereby provide improved responsiveness of the SSD device.

It will be understood that look-ahead hint data may be developed by process optimization software on a variety of other grounds or under a variety of other scenarios. In those embodiments, look-ahead hint data may be transmitted to the pre-fetch subsystem indicating anticipated LBA segment access. The LBA segment data may be retrieved from NAND locations and placed in the available DRAM cache. Additionally, the pre-fetching system may redirect I/O accesses for these LBA addresses to the data located in cache, improving SSD device responsiveness. At this point the process may end.

While embodiments have been described herein with respect to specific types of SSD controller activity and performance, other embodiments may be applied and include additional SSD controller activity relating to SSD read or write operation enhancements and function of the SSD to avoid failures in SSD cells or data. For example, if it is desirable to provide other or additional types of SSD function enhancements or caching, an embodiment using such other or additional types of function enhancements or caching may be implemented in accordance with the disclosure herein. For example, some SSD controller systems have on-board SRAM. This SRAM may be used for pre-fetch caching instead of the DRAM utilized in the example embodiments. Further, it is contemplated that any DRAM, SRAM or other RAM memory, whether on-board the SSD controller or distinct from, but operatively connected to, the SSD controller may be used for caching. In the methods described herein a flow of method steps is depicted, however it is understood that one or more of the steps may be performed in any order and some steps may be performed simultaneously. It is also understood that in some embodiments not all steps may be performed or additional steps may be added as understood by those of skill in the art. Finally, it is understood that one or more steps from each of the method embodiments disclosed may be combined in various ways to provide combination embodiments.

While the computer-readable medium is shown to be a single medium, multiple computer-readable media may be used, such as a centralized or distributed database, and/or associated caches and servers that store one or more sets of instructions. The term "computer-readable medium" shall include any medium that is capable of storing, encoding, or carrying a set of instructions for execution by a processor or that cause a computer system to perform actions as part of any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as central processor units or other processors provided by companies such as Intel®, AMD®, ARM® and others such that the software and firmware are capable of operating a relevant computing environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and equivalent structures.

What is claimed is:

1. An information handling system comprising:
a solid state drive (SSD) controller and memory device including NAND flash memory;
the SSD controller executing instructions of an SSD adaptive profiling engine for random access memory (RAM) cache optimization, wherein the SSD controller is configured to:
cache a partial flash translation layer (FTL) table in RAM including look-up addresses corresponding to logical block address (LBA) segments in the NAND flash memory having access counts reflecting SSD input/output (I/O) operations;
detect an outlier LBA segment having a look-up address in the cached, partial FTL table, wherein the outlier LBA segment has an I/O access count at a threshold level below a mean of access counts of other LBA segments represented in the partial FTL table;
evict an LBA segment look-up address associated with the outlier LBA segment from the cached, partial FTL table if an outlier LBA segment is detected; and
expand the partial FTL table cached in the RAM to load a new LBA segment look-up address in the cached, partial FTL table for an LBA segment having an access count within the threshold level of the mean of access counts of the other LBA segments represented in the partial FTL table if no outlier LBA segment is detected.

2. The information handling system of claim 1 wherein the SSD controller is further configured to replace the evicted LBA segment look-up address associated with the outlier LBA segment with another LBA segment having an access count above a threshold level from the mean of access counts of other LBA segments represented in the partial FTL table.

3. The information handling system of claim 1 wherein the threshold level for an outlier LBA segment is a standard deviation below the mean of access counts of other LBA segments represented in the partial FTL table.

4. The information handling system of claim 1 wherein the SSD controller is further configured to designate a remaining portion of the RAM not used for caching the partial FTL table as a pre-fetch data cache for I/O access operations.

5. The information handling system of claim 1 wherein the SSD controller is further configured to commence the adaptive profiling engine to determine outlier LBA segments upon determining a cache miss in the cached, partial FTL table.

6. The information handling system of claim 1 wherein the SSD controller is further configured to determine a cache hit for the partial FTL table and increment a segment count for the LBA segment access count corresponding to the hit LBA segment look-up address, and update a database of loaded LBA segment addresses in the cached, partial FTL table with access count metadata.

7. The information handling system of claim 1 wherein the SSD controller is further configured to update a database of LBA segment usage history in the NAND flash memory with access count data.

8. The information handling system of claim 7 wherein the SSD controller is further configured to commence the adaptive profiling engine to determine outlier LBA segments upon detecting shutdown of the SSD memory device.

9. A computerized method of random access memory (RAM) cache optimization for a solid state drive (SSD) including NAND memory comprising:
executing instructions, via an SSD controller, of an SSD adaptive profiling engine for RAM cache optimization;
caching, in a portion of RAM, a partial flash translation layer (FTL) table including look-up addresses corresponding to logical block address (LBA) segments in the NAND memory having a threshold level of SSD input/output (I/O) accesses;
receiving, at the SSD controller, an SSD I/O access and detecting an FTL table cache miss;
in response to the SSD I/O access FTL table cache miss, executing the adaptive profiling engine to detect whether any outlier LBA segments with cached FTL table look-up addresses have SSD I/O access counts that are below a threshold level relative to a mean of LBA segment access counts for cached LBA segment addresses in the partial FTL table; and
expanding the portion of RAM allocated for the partial FTL table cached therein to accommodate additional look-up addresses when no outlier LBA segments are detected among the cached FTL table look-up addresses.

10. The computerized method of claim 9 further comprising:
upon determining an outlier LBA segment, evicting the corresponding LBA segment address from the cached, partial FTL table; and
replacing the evicted LBA segment address with a look-up address of an LBA segment having higher SSD I/O access counts.

11. The computerized method of claim 9 further comprising:
updating a database of LBA segment usage history with an incremented access count reflecting the received SSD I/O access.

12. The computerized method of claim 9 further comprising:
in response to the SSD controller detecting an FTL table cache hit, incrementing a segment count for the LBA segment access count corresponding to the hit LBA segment look-up address; and
updating a database of loaded LBA segment addresses in the cached, partial FTL table with access count data.

13. The computerized method of claim 9 wherein the threshold level relative to the mean of LBA segment access counts is an LBA segment access count at a standard deviation threshold level of 2σ below the mean of LBA segment access counts for LBA segments corresponding to cached LBA segment look-up addresses.

14. The computerized method of claim 12 further comprising:
designating, via the SSD controller, a remaining portion of the RAM not used for caching the partial FTL table as a pre-fetch data cache for I/O access operations.

15. The computerized method of claim 9 further comprising:
receiving data look-ahead hints from a process optimization software running on an information handling system operating system indicating I/O access operations that are related to the received SSD I/O access; and
pre-fetching data from LBA segments into a pre-fetch cache corresponding to the I/O access operations indicated.

16. An information handling system comprising:
a solid state drive (SSD) controller and memory device including NAND flash memory, the SSD controller executing instructions of an SSD adaptive profiling engine for RAM cache optimization, wherein the SSD controller is configured to:
access a database of logical block address (LBA) segment usage history and load a partial flash translation layer (FTL) table into random access memory (RAM) cache if a span of LBA segments with sufficient access counts is below a threshold level percentage of total LBA segments in the NAND flash memory;
detect an outlier LBA segment having a look-up address in the cached, partial FTL table, wherein the outlier LBA segment has an input/output (I/O) access count below a statistical mean of access counts of other LBA segments represented in the partial FTL table; and
evict an LBA segment look-up address corresponding to the outlier LBA segment from the cached, partial FTL table.

17. The information handling system of claim 16 wherein the SSD controller is further configured to load a full FTL table into the RAM cache if the span of LBA segments with sufficient access counts is above a threshold level percentage of total LBA segments in the NAND flash memory.

18. The information handling system of claim 16 wherein the SSD controller is further configured to replace the evicted LBA segment look-up address corresponding to the outlier LBA segment with another look-up address of an LBA segment having an access count within a statistical deviation of the mean of access counts of other LBA segments represented in the partial FTL table.

19. The information handling system of claim 16 wherein the SSD controller is further configured to determine that no outlier LBA segments exist, and to expand the partial FTL table in the RAM cache to load a new LBA segment look-up address in the expanded partial FTL table in the RAM cache upon detecting a cache miss for an I/O access to an LBA segment.

20. The information handling system of claim 16 wherein the SSD controller is further configured to designate a remaining portion of the RAM cache that is not used for caching the partial FTL table as a pre-fetch data cache for I/O access operations.

* * * * *